Figure 1:
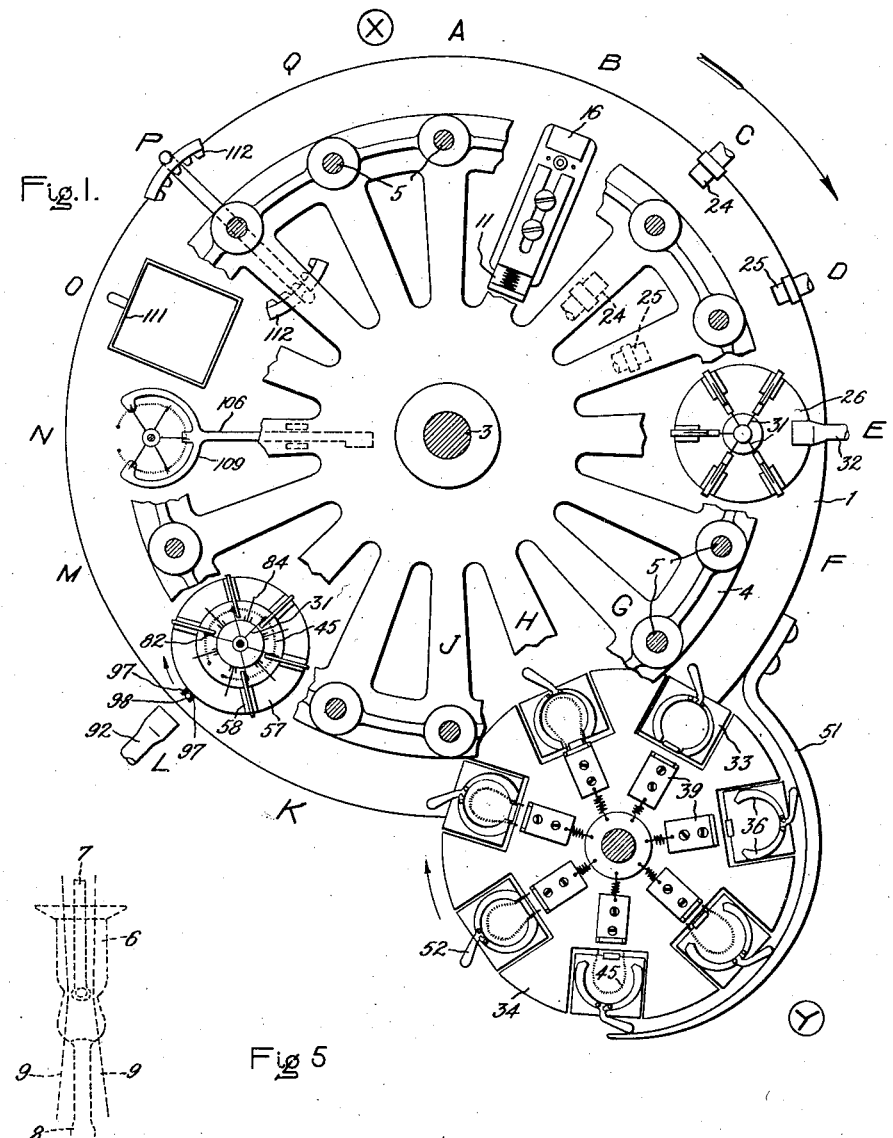

July 28, 1931.  W. LEDIG ET AL  1,816,683
FILAMENT MOUNTING MACHINE
Filed Dec. 30, 1927   7 Sheets-Sheet 1

Inventors:
Willy Ledig
Walther-Winfried Loebe
by
Their Attorney.

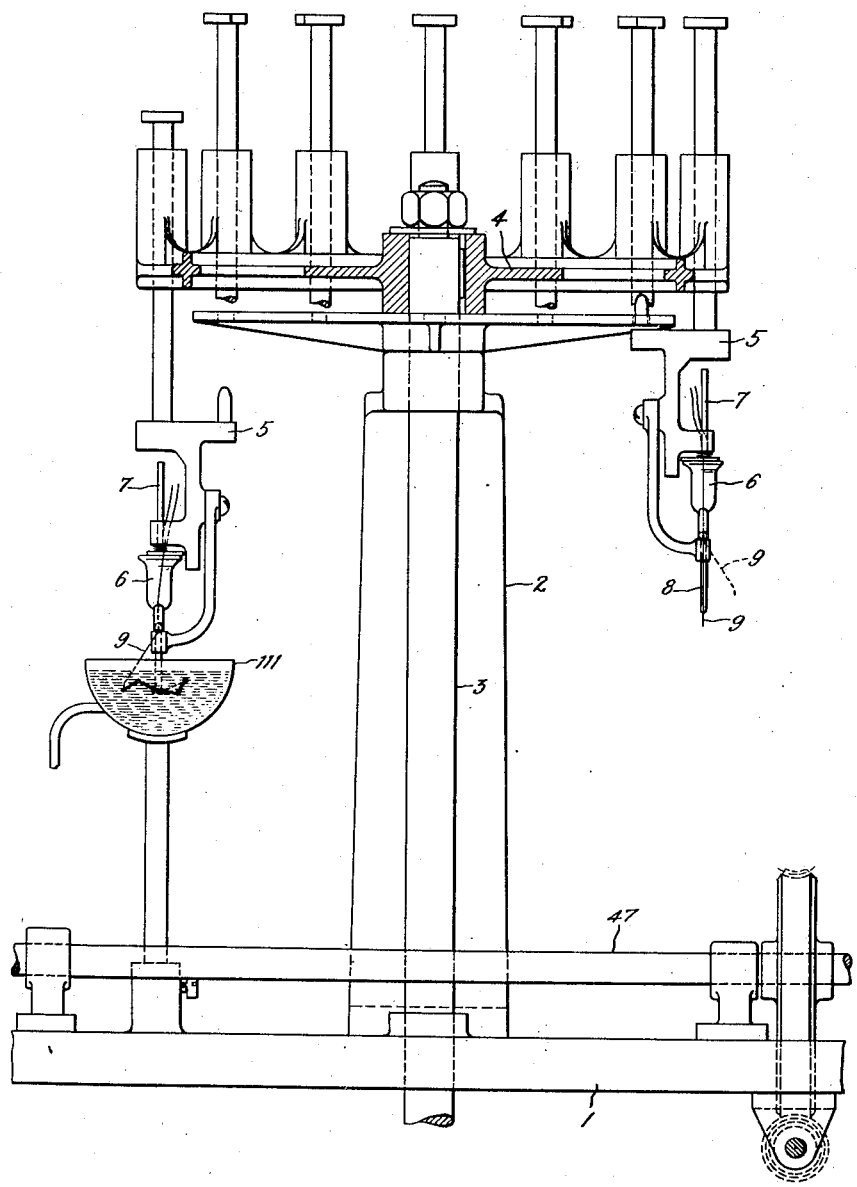

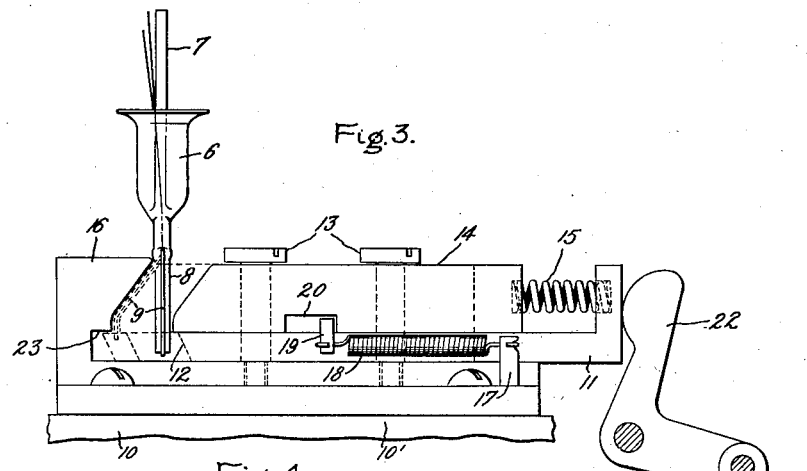
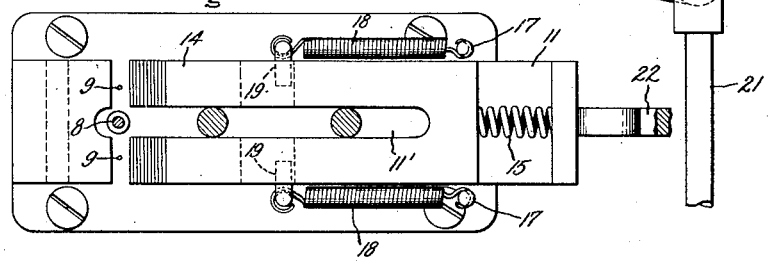
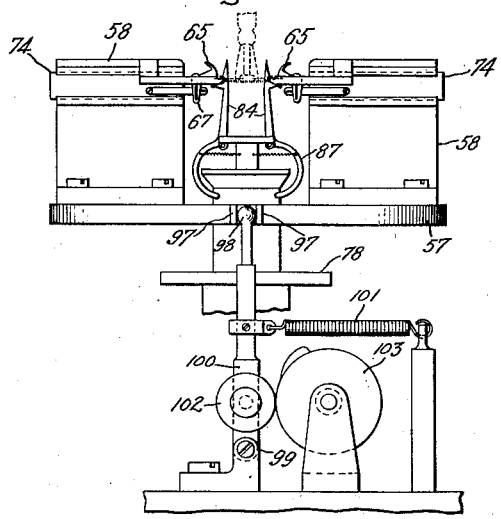
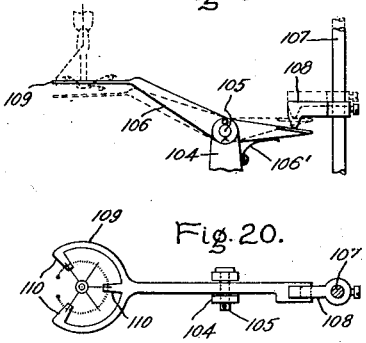
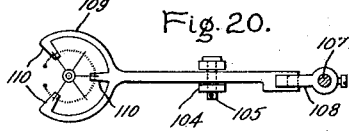

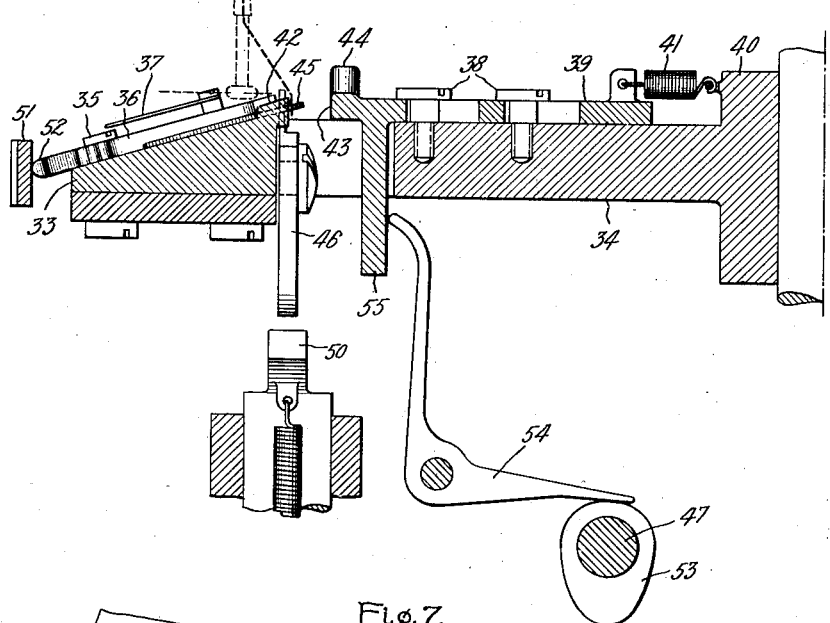
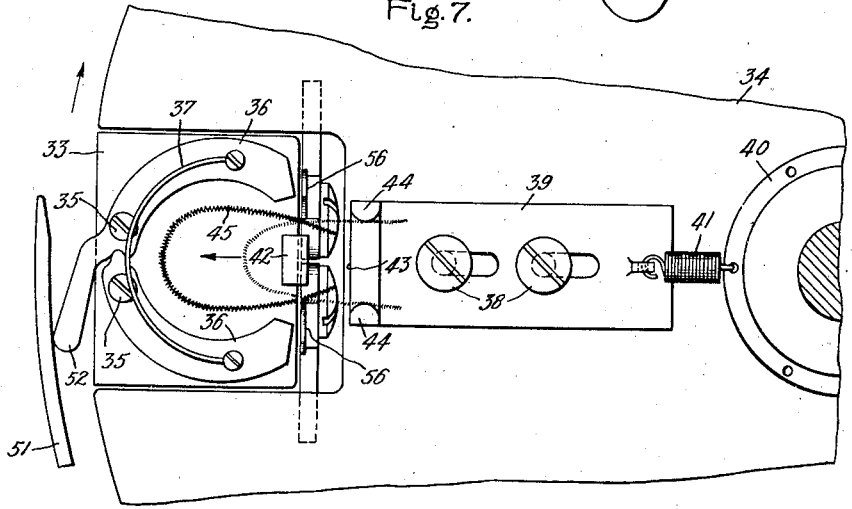

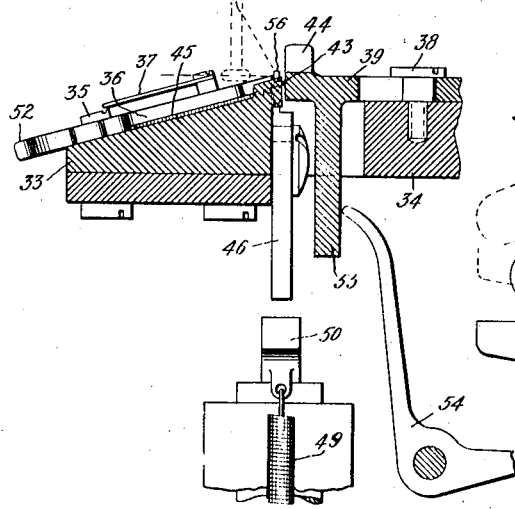
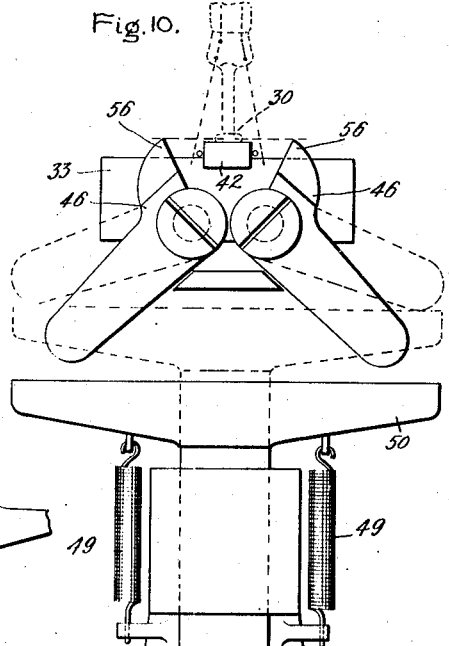
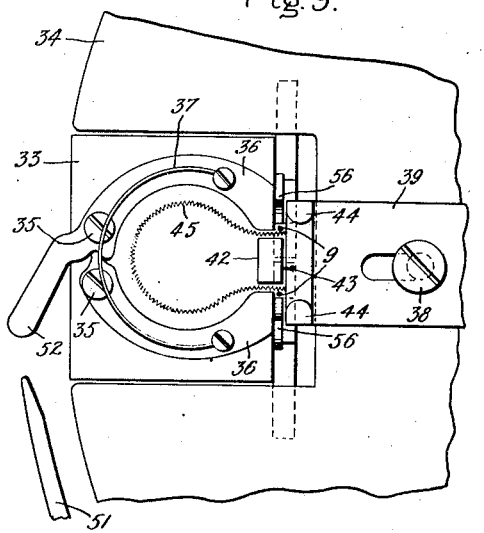

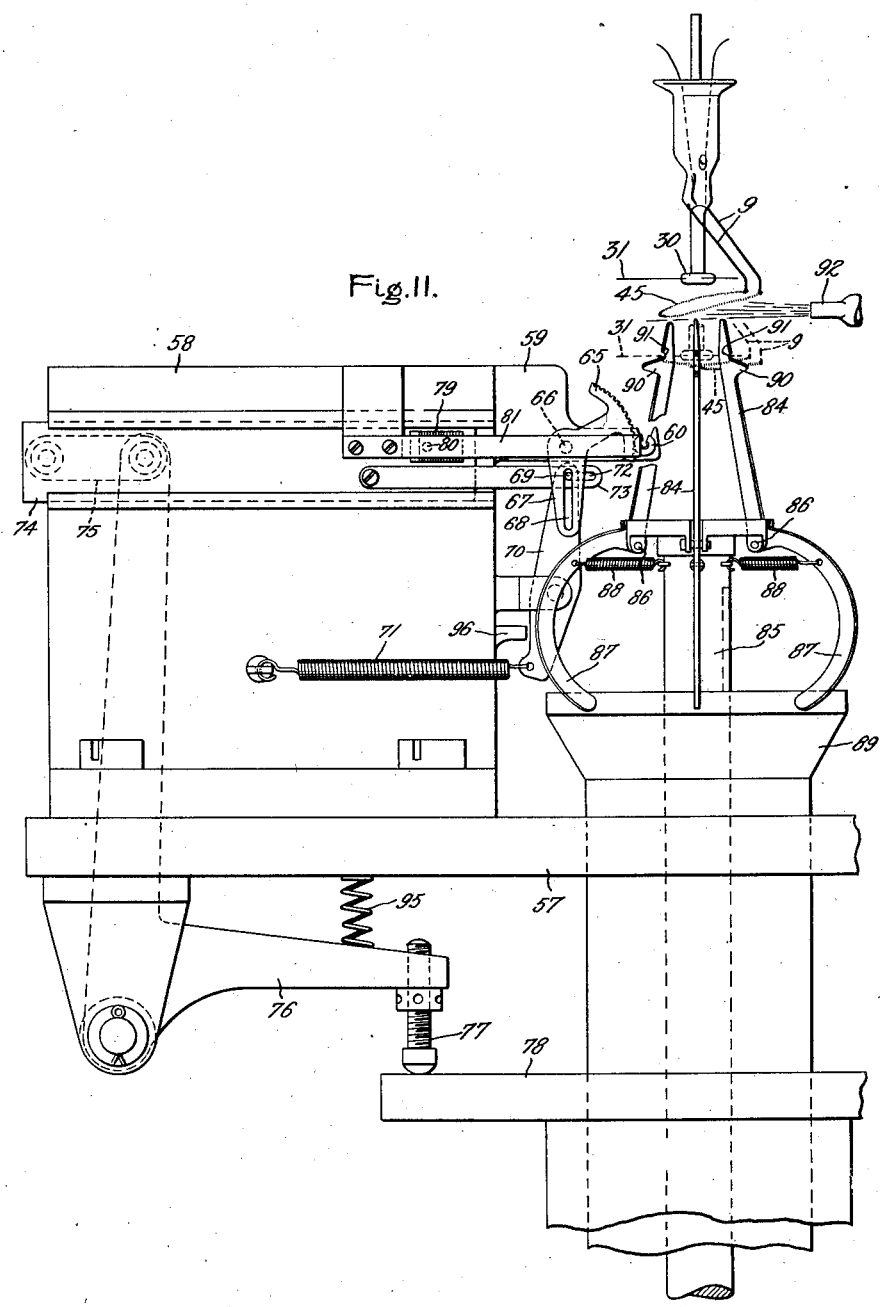

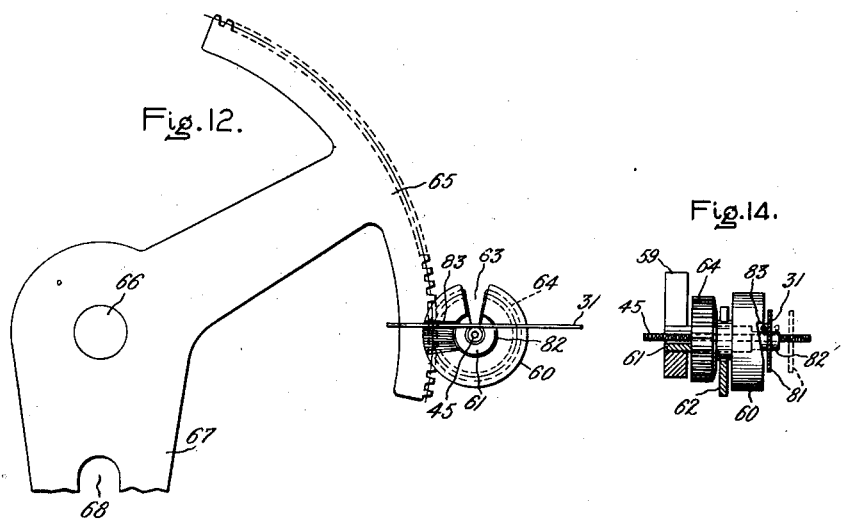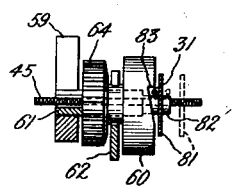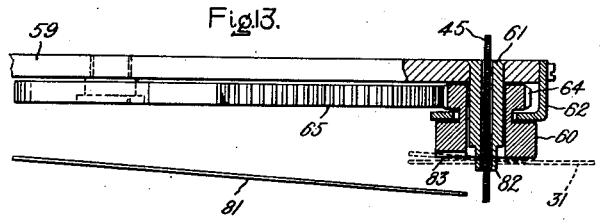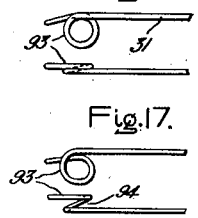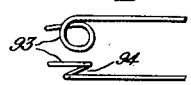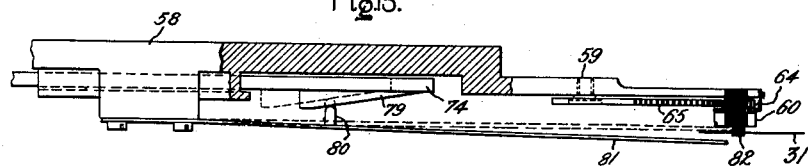

Patented July 28, 1931

1,816,683

UNITED STATES PATENT OFFICE

WILLY LEDIG AND WALTHER-WINFRIED LOEBE, OF BERLIN, GERMANY, ASSIGNORS TO GENERAL ELECTRIC COMPANY, A CORPORATION OF NEW YORK

FILAMENT MOUNTING MACHINE

Application filed December 30, 1927, Serial No. 243,698, and in Germany January 19, 1927.

In order to simplify the mounting of coiled filaments of electric incandescent lamps on the anchors of the stem it has been proposed, for example, in United States patent to Brueckman, #1,600,974, September 28, 1926, to place the filament in stationary slit supporting lugs and then bend the ends of the anchors of the stem about the stationary supporting lugs to form hooks or loops.

One object of this invention is to provide means for automatically mounting filaments in this manner, and particularly to use automatic anchor inserting machines to assist in making the mounts. To this end a novel construction of anchor bending heads for making the anchor loop is used in association with other mechanisms for performing the operation necessary to produce a mount. These bending heads are, in accordance with the invention, so constructed that they not only bend the outer ends of the embedded anchors into hooks or loops, but also cause the bent anchor ends to enclose or be bent about the coiled filament. The rotatable bending heads comprises loop benders rotatable on journals both provided in a novel manner with radial slots in which the coiled filament is inserted so as to extend axially through all the bending heads. In operation, that is, during rotation of the loop benders of the bending heads, the outer ends of all the anchors projecting laterally from the stem are bent about the coiled filament in the bending heads into loops embracing the filament, so that the coiled filament is mounted and held in the anchors simultaneously with the forming of the anchor loops which are automatically formed by the bending heads. In this mode of operation particularly when the novel bending heads are used, the ends of straight anchor wires only need be inserted into the glass bead of the arbor of the stem and thus all preliminary bending or shaping of the outer ends of the anchor wires is eliminated. Since upon completion of the loop or eye the coiled filament is enclosed in it, the loop or eye can be wound with so slight a pitch that its beginning and end are side by side without a space or so-called winding slot between them. In the usual method of mounting coiled filaments the anchor loop or eye had to be made with a pitch great enough to leave between the beginning and end of the loop a space or winding slot through which the coiled filament could be introduced from the side of the loop. This winding slot, hitherto necessary in the loops or eyes frequently permitted the filament to drop out of the anchor loop, and such loops might also cause during the operation of the incandescent lamp a short circuit between the turns of the coiled filament lying between the beginning and the end of the anchor loop, thereby causing too great a load on the remaining turns of the coiled filament and premature destruction of the filament.

The new filament mounting machine makes possible not only a safe holding of the coiled filament due to the form of the loop or eye but also considerably shortens the process of making the mount, as no special working steps are required, and the mount is finished when it leaves the machine.

In order to automatically introduce the coiled filament into the upwardly open slots of the bending heads the coiled filament may to advantage be previously fastened at its ends to the stem leads, which have been bent into the proper position and cut to length. The perpendicular descent of the stem with the filament depending from the leads places the filament in the bending head slots, an operation which may be assisted by a horizontal air jet and by auxiliary holders which extend beyond the bending heads. After the coiled filament is enclosed in the anchor loops of the stem the filament may, if desired, be coated with getter to hinder blackening of the bulb or to improve the vacuum of the lamp. In case it should be desirable the filament may also be bent into zig zag form.

Figure 5:
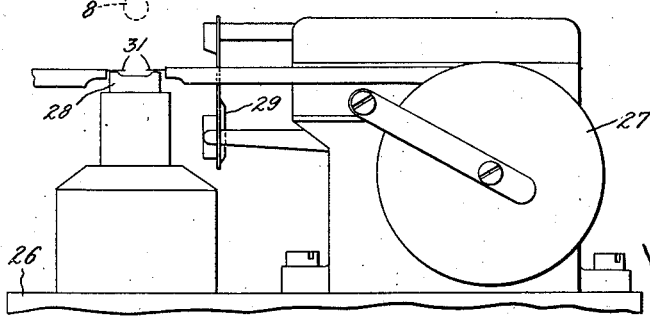

The invention will best be understood in connection with the accompanying drawings in which there is shown one example of construction of an incandescent lamp, a filament mounting machine made in accordance with the invention and in which Fig. 1 is a plan view of the machine; Fig. 2 is a view, in elevation and partly in section of part of the machine; Fig. 3 a view in elevation and Fig. 4 a plan view of mechanism for positioning the leads; Fig. 5 an elevation of mechanism for embedding the inner end of straight anchor wires in the arbor of the stem; Fig. 6 a vertical section and Fig. 7 a top plan view of a clamping mechanism for fastening the ends of the coiled filament to the leads; Figs. 8 and 9 views of the same clamping mechanism in another position of the parts; Figure 10 a view in elevation of the filament clamping levers which form part of the clamping mechanism; Fig. 11 a view in elevation of an anchor loop and the filament placing mechanism for placing the filament in the loop bending heads; Fig. 12 an elevation, Fig. 13 a horizontal section and Fig. 14 a side view all on a larger scale, of the bending head; Fig. 15 a horizontal sectional view of the bending head and mechanism for holding the anchor wire in place in the bending head; Fig. 16 side and top views of the loop of an anchor wire produced by the bending head; Fig. 17 a similar view of the loop as previously made to permit the mounting of the filament by hand; Fig. 18 a view in elevation of the actuating mechanism for partially rotating the support for the filament placer, and bending heads to free the mechanism from the finished mount; Fig. 19 a side view and Fig. 20 a plan view of a filament shaper for bending the mounted filament into zig zag shape.

The filament mounting machine shown comprises an intermittently rotatable carrier with sixteen working positions designated by A to P in Fig. 1. The machine comprises as shown in Fig. 2 a frame 1 having an upwardly projecting pedestal 2 which supports a vertical shaft 3 driven step by step by intermittent gearing not shown. A carrier or spider 4 is fixed on the upper end of the shaft 3 and consequently is rotated by the shaft step by step in a horizontal plane. The carrier 4 has on it near the rim vertically movable stem holders 5 corresponding in number to the working position of the carrier. The stems which are held by the holder 5 are of the usual construction and comprise a flare 6 (see Figs. 2, 3, 5) an exhaust tube 7, a rod or arbor 8, and two leads 9 sealed into the press of the flare, but at this time have no anchors embedded in the arbor 8. The stems, complete except for the filament anchors, are inserted by the operator located at X in the stem holder 5 at working position A with the arbor of the stem pointed downward. This insertion is conveniently done by hand but it can also be done automatically by transfer clamps which travel over the space between the filament mounting machine and an annealer located between it and the stem making machine and thus carry the stems from the annealer into the mounting machine.

The leads 9 of the stem in the holder 5 are bent out obliquely into a position suitable for the fastening of the coiled filament to them, and simultaneously are cut to exactly the same length at working position B. For this purpose there is fixed in this working position B a lead bender and cutter, (Figs. 3 and 4) mounted on a stationary stand 10 on the frame 1, and comprising a stationary bed plate 10' on which is mounted a horizontally movable lead cutting slide 11, the front edge of which constitutes a cutting blade 12. This cutting slide 11 has a guide slot 11' which fits over guide pins 13 on the bed plate 10' and also has slidably mounted on its upper side a second forked lead bending slide 14 which is also guided by the pins 13 and is resiliently connected through a coil spring 15 with the lower cutting slide 11. The front ends of the prongs of the fork or upper slide 14 are beveled off into noses for bending the lead wires 9 over against an abutment 16 on the stationary bed plate 10'. This abutment has an inclined surface which faces and fits the nose of the slide 14. Both slides are normally drawn back by two retractile springs 18 each connected at one end to a bolt 17 of the stationary supporting plate 10' and at the other end to lugs 19 which project laterally from the lower or cutting slide 11 and also extend into slots 20 in the upper or bending slide 14.

When the stem held in the stem holder 5 reaches working position B, it drops down so far that the arbor 8 and the downwardly extending leads 9 enter the gap between the abutment 16 and the front ends of the two slides 11 and 14 (Figs. 3 and 4). The driving mechanism then causes, by an actuating cam not shown, a movement of a push rod 21 to cause rotation to the left of a bell crank 22 connected to it. The bell crank produces by its rotation a forward movement of the lower or cutting slide 11 and through the spring 15 at the same time also a forward movement of the upper or bending slide 14. By the forward movement of the upper or bending slide 14 the leads 9 are caught and pressed against the abutment 16 being thereby bent obliquely until their ends are brought into position for the subsequent fastening to them of the ends of the coiled filament. The cutting slide 11 which has moved forward at the same time and to the same extent is free to move still further forward a slight distance after the bending slide is stopped by the abutment 16. The compression of spring 15 after the stoppage of the upper or bending slide permits the cutting slide to move forward until it cuts off whatever part of the leads 9 projects over the lower cutting edge 23 of the abutment 16, and thus makes both leads of the same length. As soon as the pressure on the push rod 21 ceases, first the lower or cutting slide 11 only is pulled back by the springs 18, the upper or bending slide 14 being held in its forward position by the spring 15, which acts as a detent for the upper slide during the first part of the backward movement of the lower slide. When the lugs 19 on the lower slide 11 reach the right hand ends of the slots 20 in the upper slide 14 the latter is also pulled back with the lower slide 11 by the springs 18 until both slides 11 and 14 have retreated into their initial positions. The stem holder carrying the stem is now lifted thereby lifting out of the lead cutting and bending device the stem with its leads cut to the right length and bent into the right position, and by the next step of the carrier is moved into the next working position C.

In the working positions C and D the stem is within the range of the preliminary heating burner 24 and the fusing burner 25, and as a result the lower end of the arbor 8 of the stem is fused and prepared for the reception of the anchors which are to be inserted.

In working position E the automatic insertion of the anchor wires into the arbor of the stem takes place, preferably by means of an anchor inserting device similar to that shown in United States Patent to Schluter 1,238,575, August 28, 1917. The particular device shown in the drawing comprises a base plate 26 secured to the frame 1 and carrying number of anchor wire feed mechanisms corresponding to the number of anchors to be inserted and each having an anchor wire spool 27. Whenever a stem holder comes into position these wire feed mechanisms feed the anchor wires forward until their inner ends are positioned over a central anvil 28 and are then embedded in the glass bead of the arbor 8, after which the anchor wires are cut off to the right length by knives 29. When the stem holder 5 is lowered and comes into anchor inserting position the hot glass drop hanging on the end of the arbor 8 strikes against the anvil 28 and is shaped by the anvil into a bead or button 30 (Figures 10 and 11), which overflows and takes hold of the inwardly projecting ends of the radially positioned anchor wires 31 not yet cut off from the supply spools. By an air jet 32 provided at position E the shaped glass bead is cooled off quickly after the lowering of the stem holder in order to securely hold in position the fused in anchor wires 31 which are then cut off by the knives 29.

The working positions F, G serve for the further cooling of the glass bead 30 with its embedded anchor wires and are therefore traversed by the stems without further working.

In the following working position H the ends of the coiled filaments to be mounted on the stems are fastened or clamped to the ends of the leads by a filament clamping device comprising filament jigs on which the filament is laid by an operator stationed at Y. In the present case the filament clamping mechanism comprises a turret 34 (Figs. 1 and 6 to 10) mounted on the frame 1 adjacent the path of the stem holders 5 and having spaced along its circumference seven filament jigs 33. Each jig has a pair of pivoted filament holding jaws 36 mounted on the two pivot pins 35 of the jig and movable toward and away from each other. These jaws normally tend to close under the action of a spring 37. Filament end positioning slides 39 are mounted on the turret 34 to move radially of it and toward and away from the jigs 33. These slides are guided by pins 38 on the table, and are ordinarily drawn away from the jigs and inwardly toward the center of the turret 34 by springs 41 fixed to the hub 40 of the turret. On each jig 33 between the free ends of the filament holding jaws 36 is a block 42 which serves as a stop and abutment for the forward end 43 of each filament positioning slide 39. On the upper side of each positioning slide 39 are two projecting lugs 44 which cooperate with the abutment 42 to facilitate the positioning of the coiled filament 45 in the jig. On the inner face of each jig two pinching jaws 46 are pivoted to swing between the face of the jig and the corresponding slide 39 and to close upon the sides of the abutment 42. These pinching jaws are normally open as shown in Fig. 10, and are automatically actuated from the main driving shaft 47 of the machine through a vertically movable plunger 50 raised by a cam 48 and held down by springs 49. The plunger 50 by its upward movement causes the pinching jaws 46 to close upon the abutment 42. The turret 34 carrying the jigs 33 and driven step by step by the driving mechanism in synchronism with the carrier 4 is partially surrounded by a stationary cam 51 which opens the closed filament holding jaws 36 of each jig as it moves along this cam by engaging a projecting tail 52 on one of the filament holding jaws.

As indicated in Fig. 1, the filament jaws of two or more jigs in front of the operator stationed at Y are held open by the cam 51. The operator puts onto one of the jigs with open filament holding jaws a coiled filament in such manner, as indicated by the dotted line in Fig. 7, that the coiled filament passes around the abutment 42 and its ends rest on the filament positioning slide 39 between the lugs 44 of the slide. When the coiled filament has been so placed the operator takes hold of it at the middle, usually by pinchers, and draws it outwardly of the rotary table in the direction of the arrow, until it occupies the position indicated in full lines, in which its ends still extend to a slight extent beyond the inner side of the abutment 42. As soon as in the rotation of the turret 34 the tail 52 of the jig loaded with the coiled filament slides off the cam 51 the filament holding jaws 36 will close under the action of their springs 37, thereby pressing the two ends of the filament 45 against the sides of the abutment 42 but not clamping it fast thereto. The further rotation of the turret 34 carries the jig 33, with the filament lying on it and its filament holding jaws 36 closed, under the stem holder which is in the working position H. The stem holder has in it a stem with the leads bent into position and with radially projecting anchors embedded in the bead 30. In this working position H the stem holder is lowered whereby the ends of the downwardly projecting leads 9 of the stem come to lie on both sides of the abutment 42 beyond which the ends of the filament 45 in the jig project somewhat. Immediately after the lowering of the stem a cam 53 located on the main driving shaft 47 of the machine actuates a bell crank 54 (Figs. 6 and 7) which so acts on a downwardly extending leg 55 of the filament positioning slide 39 that the latter is moved radially and outwardly of the turret 34 against the pull of the spring 41. The front end 43 of the slide pushes back to a slight extent the projecting ends of the filament 45 and also the lower ends of the leads 9 (Fig. 6) until the front end 43 of the positioning slide 39 bears against the adjacent side of the abutment 42. The ends of the filament 45 and also the leads 9 then are close to the contacting surfaces of the abutment 42 and of the slide 39. The ends of the coiled filament 45 now have a very definite and predetermined position in the jig and also with relation to the leads, so that the filament can safely be secured to the leads 9. The plunger 50 now rises and thereby closes the pinching jaws 46 upon the abutment 42, whereby the teeth 56 of the jaws bear from the outside against the ends of the leads 9 and pinch them together with the ends of the filament firmly against the abutment 42, which acts as an anvil, so that the filament ends are embedded in the leads. Although by this pinching there is usually obtained a sufficient attachment of the leads to the filament ends, there may for greater safety be obtained a mutual welding of the filament and the leads at the points of contact by means of an electric circuit which is closed by the actuating of the pinching jaws.

Shortly after the pinching of the leads and the filament the pinching jaws 46, as well as the positioning slide 39, go back into their initial position so that at the next rise of the stem holder the filament clamped fast to the leads can easily be pulled upward out of the jig; it hangs looplike from the stem after the stem has risen. The rotation of the turret 34 also causes the opening of the filament holding jaws 36 and release of the filament in consequence of the tail 52 running up onto the cam 51.

The positions J, K of the machine are idle positions due to the necessity for properly spacing the various mechanisms.

In the next working position L the outer ends of the embedded anchor wires 31 are bent into loops which enclose the coiled filament 45. For this purpose there is provided at this position a hook bending mechanism comprising a circular table 57 coaxial with whatever stem holder 5 of the machine (Figs. 1 and 11) is at working position L. The table 57 carries pedestals 58 corresponding in number to the number of anchors 31 and set radially about the center of the table like the anchors about the bead 30. Each pedestal 58 has an inwardly projecting arm 59 on which a bending head comprising a rotatable hook or loop bender 60 (Figs. 11 to 15) is mounted to rotate freely on a tubular journal or pin 61 fixed in the arm 59, the bender being held in place on the pin by a bracket 62 on the arm. The tubular pin or journal 61 of each bending head is bored through longitudinally and also slotted on one side, these slots of the bending head journals 61 being in the idle position of the loop bender in registry with a radial longitudinal slot 63 provided in the restraining bracket 62. Each loop bender is rotated by a pinion gear 64 in engagement with a toothed segment 65 pivoted on the arm 59 to oscillate about a pin 66. The toothed segment 65 is driven through a downwardly extending arm 67 having a slot 68 which receives a pin 69 on the upper end of a lever 70 pivoted on the pedestal 58. The lower end of the lever 70 is controlled by a spring 71 fixed to the pedestal 58. By the action of spring 71 and lever 70 the toothed segment 65 and with it the loop bender 60 is held in the normal position shown in Figs. 11 and 12, and thus with its slot upward and in registry with slot 63 in the bracket 62. The actuating mechanism for the hook bending mechanism moves the lever 70 and associated parts by means of the pin 69 which projects not only through the slot 68 in the arm 67 but also through the slot 72 in a link 73 fixed to a slide 74 mounted to slide radially in the pedestal 58. The slide 74 is connected by a link 75 to one arm of a bell crank 76 fixed to the table 57, the other end of the bell crank engaging through an adjusting screw 77 an actuating sleeve 78 movable up and down by the driving mechanism of the machine.

On each slide 74 radially actuated by the sleeve 78 there is arranged a wedge 79 (Figs. 11 and 15) which acts on the pin 80 of a leaf spring 81 fixed to the pedestal 58. The forward free end of this leaf spring 81 is usually located near the corresponding loop bender 60. As the slide 74 moves outwardly and away from the loop bender 60 its wedge 79 slides out from under the pin 80 of the leaf spring and releases the spring which then, due to its own elasticity, springs into the position shown in dotted lines in Fig. 15, where it presses with its free end upon the anchor wire 31 in engagement with the loop bender. Due to the lowering of the stem the outer end of this embedded anchor wire rests on the projecting small end 82 of the bending head pin or journal 61 and against the face of the loop bender lying in a ratchet tooth groove 83 provided on the face of the loop bender 60, as shown in Figs. 12 to 14. The anchor wire 31 is thus coupled both by the outward movement of the slide 74 and by the pressure of the leaf spring 81 to the loop bender 60 for the purpose of forming the loop around the small end of the pin 61 as a mandrel.

In place of the leaf spring 81 pressing the anchor wires inwardly there may also be used spring actuated punches perpendicular to the faces of the bending heads and likewise actuated by the slides 74.

The coiled filament is placed in the bending heads by a filament placing mechanism of which one form is shown in the drawing. In this form several pivoted filament holders swing in intersecting radial planes to bring their adjacent ends together to permit the filament loop to pass onto and be guided by the holders. Between the loop bender 60 and radially displaced therefrom are upwardly extending arms 84 of filament holders pivoted to swing toward and away from one another in planes which intersect in the longitudinal axis of a stem in the stem holder at working position L. These filament holders are pivoted by pins 86 to a rod 85 which extends through the table 57 and is movable up and down independently of the actuating sleeve 78. The lower arc shaped arms 87 of the filament holders are held against a control cone 89 by springs 88. The upper ends of the filament holders have projecting noses 90 and notches 91 for catching and holding the coiled filament 45 brought onto them by the lowering of the stem. Above and to one side of the filament holder arms 84 there is a compressd air nozzle 92 which delivers a horizontal jet to swing into a horizontal position the coiled filament hanging like a loop from the leads as the filament is lowered with the stem towards the filament holders and thus facilitate its engagement with the filament holders.

When the stem comes into the working position L all the parts of the loop bending mechanism are in the normal positions shown in Figs. 11 to 15. When the stem is lowered the filament 45, hanging in a loop from the leads 9 of the stem is first brought into a horizontal position by the air jet from the compressed air nozzle 92 as shown. As the stem is lowered the filament slides over the inwardly set points of the filament holder arms 84 until it strikes their noses 90. Then together with the further descent of the stem there also takes place a downward movement of the rod 85 and of the filament holders 84, 87, pivoted on the rod. In this bodily downward movement of the filament anchors their lower arms 87 slide over the control cone 89 and are drawn together by the springs 88. This causes a spreading apart of the upper filament holder arms 84, and therewith a stretching of the coiled filament 45 to an almost circular loop until it lies in the notches 91 of the holder arms 84. In the further continued downward movement of the stem and filament holders the coiled filament 45 drops into the slots 63 of the loop bender 60. The downward movement of the stem and the filament holders is so regulated that it is completed at the moment the coiled filament rests in the bore of the stationary tubular journals 61 of the bending heads. At the same time, with the completion of the lowering of the stem, the radially projecting anchor wires 31 have come to lie on the ends 82 of the journals 61, these ends projecting beyond the loop benders and acting as mandrels around which the anchor wire is bent. Now the radial outward movement of all the slides 74 takes place. Upon the beginning of this movement all the leaf springs 81 are immediately released by the wedges 79, so that they snap inward at their free ends and press the ends of the anchor wires 31 resting on the narrow end 82 of the tubular journal 61 into the ratchet tooth grooves 83 of the loop bender and thus holds them in the grooves. In the further movement of the slides 74 the right hand end of the slot 72 of link 73 engages the pin 69, so that then this pin is also carried along as the slide moves further. The carrying along of pin 69 causes, however, as can be seen from Fig. 11, a swinging or rotation of the toothed segment 65 and one complete revolution of the loop bender 60. The latter carries along in its complete revolution the anchor wire 31 pressed into its ratchet tooth groove 83 and bends the free end of the anchor wire about the pin 82 as a mandrel and into a loop or eye 93, the beginning and end of which lie close together as shown by Fig. 16, so that there is no slot 94 (Fig. 17) between the beginning and the end of the loop 93 as in the loops hitherto used for the mounting by hand of the coiled filament. The coiled filament 45 is held much more securely in this novel loop as shown in Fig. 16, and is thus held more safely.

Immediately after the completion of one revolution of the loop bender the actuating sleeve 78 is lowered, and by the action of the retractile springs 71 and 95 the return movement of the slides 74 occurs. In this return movement of the slides the toothed segments 65 and with them the loop benders 60 are turned back to their initial position. The ratchet tooth grooves 83 of the loop benders thereby slide with their bevel sides beneath the formed loops 93 of the anchor wires 31 and force the loops and with them the free ends of the pressure leaf spring 81 onto the flat portion of the faces of the loop benders, so that the loops rest only on the flat faces of the loop benders. Shortly before the slides 74 complete their return movement the levers 70, the toothed segments 65, and the loop benders 60 again assume the normal positions shown in Fig. 11, so that in the last part of the movement of each slide only the link 73 belonging thereto is carried along by the slide until the left hand end of its slot 72 engages the pin 69 of the lever 70, which is held in position by the stop 96. During this short last part of the movement of the slide 74 and the link 73 the wedge 79 belonging thereto comes under the pin 80 of the leaf spring 81 and raises it from the loop bender 60, so that only the loop bears against the face of the loop bender 60.

The removal of the stem provided with the anchor loops is not yet possible because the loops 93 not only embrace the coiled filament 45, but also the narrow ends 82 of the journals 61 of the bending heads. To free the loops the table 57 is rotated slightly in the direction of the arrow shown in Fig. 1 thereby moving the entire loop bending mechanism, but only to the extent of a small fraction of a revolution, which suffices for the removal of the ends 82 of the pins 61 from the loops 93. For this purpose there are provided on the circumference of the disc 57 two stop lugs 97 (Fig. 18) between which is the ball head 98 of an oscillating lever 100 pivoted on a stationary pin 99.

This oscillating lever is held by a spring 101 and bears with a cam roller 102 on a cam 103 turned by the driving gear of the machine and coming into action once during each stop of the carrier 4. When the cam 103 comes into action it presses the oscillating lever 100 to the left, whereby the table 57 is turned somewhat, carrying with it the entire loop bending mechanism. The projecting ends 82 of the journals of the bending heads are thus drawn laterally, as seen from Fig. 1, from the formed loops 93 of the anchor wires. As soon as this turn of the table 57 has occurred, the stem holder rises with the stem, and thus lifts the coiled filament lying in the loops 93 of the anchor wires 31 from the slots 63 of the bending heads. At the same time with the lifting of the stem there also occurs a lifting of the rod 85 carrying the filament holders 84, so that at the beginning of the rise of the stem the coiled filament 45 is also at the same time carried by the filament holders. With a continued rise of the stem and the rod 85 there is caused by the stationary control cone 89 an inward movement of the filament holders 84 which frees them from the filament, so that toward the end of the rise of the stem the coiled filament 45 hangs only on the loops of the anchors. During the rise of the stem and the filament holders the table 57 was again turned back into its initial position by the retractile spring 101.

The stem with the filament in the anchors is now moved by the continued movement of the carrier 4 into the idle position M and then into working position N, in which a filament shaper for shaping the mounted filament into zig zag form may be provided. This filament shaper separately shown in Figs. 19 and 20, comprises a pedestal 104 fixed to the stationary frame 1 and a lever 106 pivoted on a pin 105 in the pedestal. The inner end of this lever is positively actuated by a pull rod 107 through a finger 108. The outer end is formed into a semi-circular fork 109 with three inwardly extending prongs 110. When the stem holder 5 firmly holding the stem with the filament comes into the working position N the stem holder 5 is again lowered until the coiled filament 45 lies on the prongs 110 of the fork 109 or stands just above them. The prongs 110 are so arranged that they are in registry with three anchors 31 of the stem and at the same time leave the other anchors unsupported between them. Immediately upon the positioning of the coiled filament 45 the actuating lug 108 moves the fork 109 upward, with the result that the anchors 31 resting on or standing over the prongs 110 are bent obliquely upwards and the filament assumes a zig zag shape. Whilst the stem holder with the shaped filament again rises the fork 109 drops back as the finger 108 rises and thereby returns to its initial position indicated by the dotted line in Fig. 19 by its own weight assisted by a spring 106'.

At the next working position O is a gettering device for applying a coating of getter to the mounted filament for hindering blackening of the lamp, and for improving its vacuum. Here there is shown in the example illustrated a getter container 111, (Figs. 1 and 2) for the reception of a suitable suspension of getter, such as phosphorus which is advantageously always kept stirred up. The coiled filament 45 is dipped into the getter suspension by the lowering and lifted out of it by the raising of the stem holder 5.

In the next working position P the superfluous getter is blown off by air jets from the air nozzles 112 and the getter on the filament is dried at the same time. The working position Q permits the removal of the finished stems. If desired there can be provided in this working position a transfer device for automatically transmitting the stems to a sealing-in machine set up next to the filament mounting machine just described.

The machine above described performs automatically the operations necessary to attach the filament to the stem as delivered by the stem making machine and to complete the mount ready for insertion in the bulb. Many of these operations particularly the attaching of the ends of the filament to the leads of the stem and the securing of the filament to the anchors have heretofore been performed by hand by a skilled operator. When a machine embodying this invention is used the operators need only keep the machine supplied with stems and place the filaments on the filament jigs of the filament clamping mechanism neither of which operations require any special skill.

In the operation of the machine the stem, consisting of the glass flare, a glass rod or arbor and two leads projecting parallel to the arbor, is placed in the stem holder which is then automatically carried to the various working positions in which the operations of mounting the filament are performed automatically. The stem goes to the lead cutting and bending mechanism which automatically cuts the leads to the proper length and also bends them into the position which they occupy in the finished mount. The stem then goes to the anchor inserting mechanism where the lower end of the glass rod or arbor is heated until it is soft and the inner ends of the anchor wires are positioned with relation to one another whereupon the stem is lowered and the soft end of the arbor formed into a button in which is embedded the ends of the anchor wires. The anchor wires are then cut to the proper length, and the stem is provided with straight radially projecting anchors on which the filament will later be mounted. The stem then goes to the filament clamping mechanism where it meets the filament on the filament jig and where the ends of the filament are automatically pinched into the ends of the leads, thereby fastening the ends of the filament to the leads. The filament is now in the form of a loop fastened at the ends and is immediately beneath the straight radially projecting anchor wires. The stem is then lifted, and carried into registry with and lowered toward the hook bending mechanism with the filament hanging from the ends of the leads. The depending filament is blown into a more or less horizontal position by an air blast, and further downward movement of the stem lowers the substantially horizontal filament loop onto the closed upper ends of the filament holding arms. These filament arms then open as the filament comes to rest on their projecting noses, and the further opening of these arms make the filament loop into a circle. The filament arms then move bodily downward with the stem and thereby deposit the filament in the slots of the bending heads, while at the same time the straight outer ends of the anchor wires come into place on top of the filament in the bending head and against the faces of the rotary loop bender. While the parts are in this position all of the loop benders are rotated to bend the outer ends of the straight anchor wires about the ends of the tubular pivots of the loop benders as a mandrel and thereby bend the ends of the anchor wires into closed loops which encircle the filament. The loop benders then go back to their initial position and in order to free these loops from the mandrels the entire hook bending mechanism is rotated slightly to withdraw the ends of the mandrels from the loops, thereby freeing the stem from the hook bending mechanism after which the upward movement of the stem lifts the filament out of the hook bending mechanism.

The filament is now mounted on the stem and for many types of lamps is complete. In some cases it is desirable to shape the mounted filament into zig zag form and in such cases the mount is carried into operative relation to the filament shaper which automatically bends every other anchor out of the plane in which the anchors were inserted, thereby making the filament zig zag in shape. Where the filament is to be gettered it then goes to a gettering device consisting essentially of a cup containing the getter solution and is automatically dipped into this cup, thereby coating the filament with the getter. The surplus getter is then blown off the filament by means of an air jet and the mount is completed and ready for insertion in the bulb.

What I claim as new and desire to secure by Letters Patent of the United States, is:

1. A filament mounting machine comprising a plurality of bending heads disposed about a common center at points on substantially a horizontal circle and each comprising a tubular bending pin set horizontal and tangential to the circle and having a longitudinal slot in its side, a loop bender rotatably mounted on said pin and having a longitudinal slot in its side and a bending face transverse to said pin and through which the end of said pin projects to form a mandrel, said bending face being shaped to engage a straight wire lying against it and by rotation of said loop bender to bend said wire around said mandrel into an eye concentric with and larger than the bore of said pin, actuating means for normally holding said pin and said loop bender with their slots in registry and open on the same side of said circle and for rotating said loop bender on said pin, and a stem holder for holding a stem with radially projecting straight anchor wires at said common center with the outer ends of said anchors across said mandrels and in engagement with the bending faces of said loop benders.

2. A filament mounting machine comprising the combination of a movable stem holder, a filament clamping device adjacent the path of travel of said holder for fastening the ends of a filament to the leads of a stem in said holder, a hook bending mechanism adjacent the path of travel of said holder and comprising a plurality of bending heads positioned radially about a common center and each having a rotatable bending member with a longitudinal slot to permit a filament to come into operative relation to an anchor wire extending transversely of and in engagement with the end of said bending member whereby said head can bend the anchor wire into a loop around the filament, and means for bringing said stem holder into operative relation to said filament clamping device and then into operative relation to said hook bending mechanism.

3. A filament mounting machine comprising the combination of a movable stem holder for holding a stem with projecting leads, a lead bender comprising a stationary abutment having a sharp lower edge, a forked bending jaw mounted to reciprocate toward and away from said abutment and having prongs cooperating with said abutment, a lead cutter comprising a blade cooperating with the sharp edge of said abutment and movable with and beyond said bending jaw, a resilient connection between said jaw and said blade, actuating means for moving said bending jaw and said blade toward said abutment and then moving said blade further to carry its cutting edge beyond the lower edge of said abutment, and means operative in synchronism with said actuating means for moving said stem holder toward said abutment to bring the leads of a stem in said holder between said abutment and said jaw whereby said leads are bent into contact with said abutment and are cut to predetermined length.

4. A filament mounting machine comprising the combination of a movable stem holder, a filament clamper comprising a filament supporting jig with an abutment projecting above its surface and of a width equal to the spacing between the ends of the leads of a finished mount, clamping jaws and pinching jaws mounted to close upon the sides of said abutment, a filament positioning member wider than and movable into contact with the end of said abutment, and common actuating means for said stem holder and said filament clamper for moving said stem holder to place the ends of the leads of a stem in said stem holder adjoining the sides of said abutment and to actuate said positioning member and said pinching jaws in sequence.

5. A filament mounting machine comprising a filament clamper comprising a rotary horizontal table, a filament jig on said table with an upwardly projecting abutment facing the center of said table, spring actuated clamping jaws for closing upon the sides of said abutment, a filament positioning slide wider than said abutment and movable radially of said table to engage the face of said abutment, and actuating means for rotating said table and controlling said clamping jaws and said slide.

6. A filament mounting machine comprising a filament clamper comprising a rotary horizontal table, a filament jig on said table with an upwardly projecting abutment facing the center of said table, spring actuated clamping jaws pivoted on said jig to close upon the sides of said abutment, one of said jaws having a projecting tail, and a stationary cam encircling part of said table in position to be engaged by said tail and thereby hold said jaws open during a predetermined portion of the travel of said jig.

7. A filament mounting machine comprising a filament clamper comprising a rotary horizontal table, a filament jig on said table with an upwardly projecting abutment facing the center of said table, spring actuated clamping jaws for closing upon the sides of said abutment, a filament positioning slide wider than said abutment and movable radially of said table to engage the face of said abutment, pinching jaws on said jig mounted to close upon the sides of said abutment between said clamping jaws and said slide and thereby pinch together stem leads adjoining the sides of said abutment and a filament lying in said jig with its ends adjoining said abutment and overlapping the leads.

8. A filament mounting machine comprising an anchor wire bending head comprising a tubular pivot having a longitudinal slot, a loop bender rotatable on said pivot having a corresponding longitudinal slot, said bender having in its face a radial ratchet tooth groove, a resilient member normally pressed against the face of said loop bender to hold an anchor wire in said groove during rotation of said bender and a stem holder for holding a stem to bring into said groove the end of a radial anchor in said stem.

9. A filament mounting machine comprising an anchor wire bending head comprising a tubular pivot having a longitudinal slot, a loop bender rotatable on said pivot and having a corresponding longitudinal slot, said bender having a driving pinion for rotating it and a radial ratchet tooth groove on its face, a leaf spring fixed at one end with its free end overlapping and normally in contact with the face of said bender, an actuating slide mounted to reciprocate radially of said loop bender and having a lug cooperating with said spring to force its free end away from the face of said bender, a gear in mesh with the pinion on said bender, actuating mechanism for said slide and said gear for moving said slide to release said spring and simultaneously rotate said bender and a stem holder for holding a stem with a radial anchor to place in said groove the end of a radial anchor in said stem.

10. A filament mounting machine comprising the combination of a movable stem holder, a filament clamping mechanism for securing the ends of a filament to the ends of the leads of a stem, a hook bending mechanism comprising bending heads disposed radially about a common center and each having a slot with its mouth normally upward, said two mechanisms being positioned side by side and adjacent the path of said holder, means for directing an air blast horizontally over said hook bending mechanism, and common actuating means for moving said stem holder into registry with and into operative relation to said filament clamping mechanism and actuating said mechanism to secure the ends of a filament to the leads of a stem in said holder and then moving said stem holder into registry with said hook bending mechanism and thereby bringing said filament within range of said air blast to hold it horizontally above and in registry with the mouth of the slots in said bending heads.

11. A filament mounting machine comprising the combination of a plurality of bending heads disposed in a horizontal circle about a common center, and each having a rotatable bender with a longitudinal slot parallel to its axis of rotation and substantially tangential to said circle, a plurality of filament holders concentric with said bending heads and pivoted to swing in vertical planes which intersect at said common center and to be bodily movable vertically, and actuating means for separating said filament holders, moving them bodily downward, and then rotating all said benders.

12. A filament mounting machine comprising the combination of a plurality of bending heads disposed in a horizontal circle about a common center and each having a rotatable bender with a longitudinol slot parallel to its axis of rotation and substantially tangential to said circle, a plurality of filament holding arms concentric with said bending heads and pivoted intermediate their ends to swing in vertical planes which intersect at said common center and to be bodily movable vertically, each of said arms having near its upper end a laterally projecting nose, a conical cam fixed below said arms with its longitudinal axis in alignment with said common center in position to be engaged by the lower ends of said arms and tapered to permit said lower ends to approach one another as said arms are lowered bodily, and means for resiliently holding the lower ends of said arms against the tapered surface of said cam.

13. A filament mounting machine comprising the combination of a rotatable table, a plurality of bending heads disposed on said table in a circle about the center of said table, each comprising a tubular pivot tangential to said circle and slotted longitudinally and a slotted loop bender rotatably mounted on said pivot with a loop bending face from which the end of said pivot projects to act as a mandrel around which said bender may bend an anchor wire as said bender rotates, and actuating mechanism for rotating said loop benders and then rotating said table to withdraw the projecting ends of said pivots from the loops bent around them by the rotation of said benders.

14. A filament mounting machine comprising the combination of a stem holder movable step by step into a plurality of working positions in succession, a filament mounting mechanism in registry with one of said positions for securing a filament on the anchors of a stem held in said holder, a filament bending mechanism mounted in registry with a subsequent working position and comprising a fork having prongs positioned to engage alternate anchors of the stem in said holder and vertically movable to bend said anchors out of their original plane, and common actuating means for bringing said holder into registry with said fork and moving said fork vertically while said stem holder is in registry with it.

15. A filament mounting machine comprising the combination of a stem holder for holding a stem with a radially projecting straight anchor wire, bending head comprising a bending pin set to extend transversely of the end of the anchor wire of a stem in said holder and having a longitudinal slot slightly wider than the diameter of a filament, a tubular loop bender rotatably mounted on said pin and having in its side a slot of substantially the width of said slot in said pin and a bending face transverse to said pin and through which the end of said pin projects to form a mandrel, said face being shaped to engage and bend the end of said anchor wire around said mandrel into an eye as said loop bender rotates, and actuating means for normally holding said pin and said loop bender with their slots in register and for rotating said loop bender upon said pin.

16. A filament mounting machine comprising the combination of a stem holder for holding a stem with a radially projecting straight anchor wire, a tubular loop bender mounted to rotate about an axis transverse of the anchor wire of a stem in said holder and having in its side a longitudinal slot slightly wider than the diameter of a filament and on its ends a projecting bending lug eccentric to its axis of rotation, a mandrel projecting beyond said end of said loop bender with a longitudinal slot which forms an extension of said slot in said loop bender, said bending lug being positioned to engage and bend the end of the anchor wire around said mandrel into an eye as said loop bender rotates, and actuating means for rotating said loop bender.

17. A filament mounting machine comprising the combination of a stem holder for holding a stem with a radially projecting straight anchor wire, a tubular loop bender mounted to rotate about an axis transverse of the anchor wire of a stem in said holder and having in its side a longitudinal slot slightly wider than the diameter of a filament and on its end a projecting bending lug eccentric to its axis of rotation, a mandrel projecting beyond said end of said loop bender with a longitudinal slot which forms an extension of said slot in said loop bender, means for holding the end of the anchor wire between said mandrel and said bending lug, and actuating means for rotating said loop bender.

18. A filament mounting machine comprising the combination of a rotatable tubular loop bender having in its side a longitudinal slot slightly wider than the diameter of a filament and on its end a projecting bending lug eccentric to its axis of rotation, a mandrel projecting beyond said end of said loop bender with a longitudinal slot which forms an extension of said slot in said loop bender, a stem holder for holding a stem with a radially projecting straight anchor wire extending transversely of the axis of rotation of said loop bender and with its end between said bending lug and said mandrel in position to be bent around said mandrel into an eye as said loop bender rotates, said loop bender and said stem holder being relatively movable to remove said eye from said mandrel, and actuating means for rotating said loop bender and then moving said stem holder and said loop bender relatively to each other to remove the eye from said mandrel.

19. A filament mounting machine comprising the combination of a plurality of hook bending heads disposed in a horizontal circle about a common center for bending the ends of anchors over a filament, a stem holder for holding a stem with radially extending anchors with their outer ends in operative relation to said heads, a filament placing mechanism comprising a plurality of filament placing fingers mounted to be bodily movable vertically and pivoted to swing in vertical planes which intersect at said common center an actuating member for spreading said filament holding fingers and then moving them bodily downward, and driving means for actuating said filament placing mechanism and said bending heads in sequence.

20. A filament mounting machine comprising the combination of a reciprocating rod, an annular cam having an actuating surface concentric with said rod and inclined to the axis of reciprocation of said rod, filament holders pivoted on said rod to swing in planes which intersect at the axis of reciprocation of said rod, each holder having one end in contact with the actuating surface of said cam, and actuating means for moving said rod and said cam relatively to each other to swing said holders on their pivots.

In witness whereof, we have hereunto set our hands this 14th day of December, 1927.
WILLY LEDIG.
WALTHER-WINFRIED LOEBE.